UNITED STATES PATENT OFFICE.

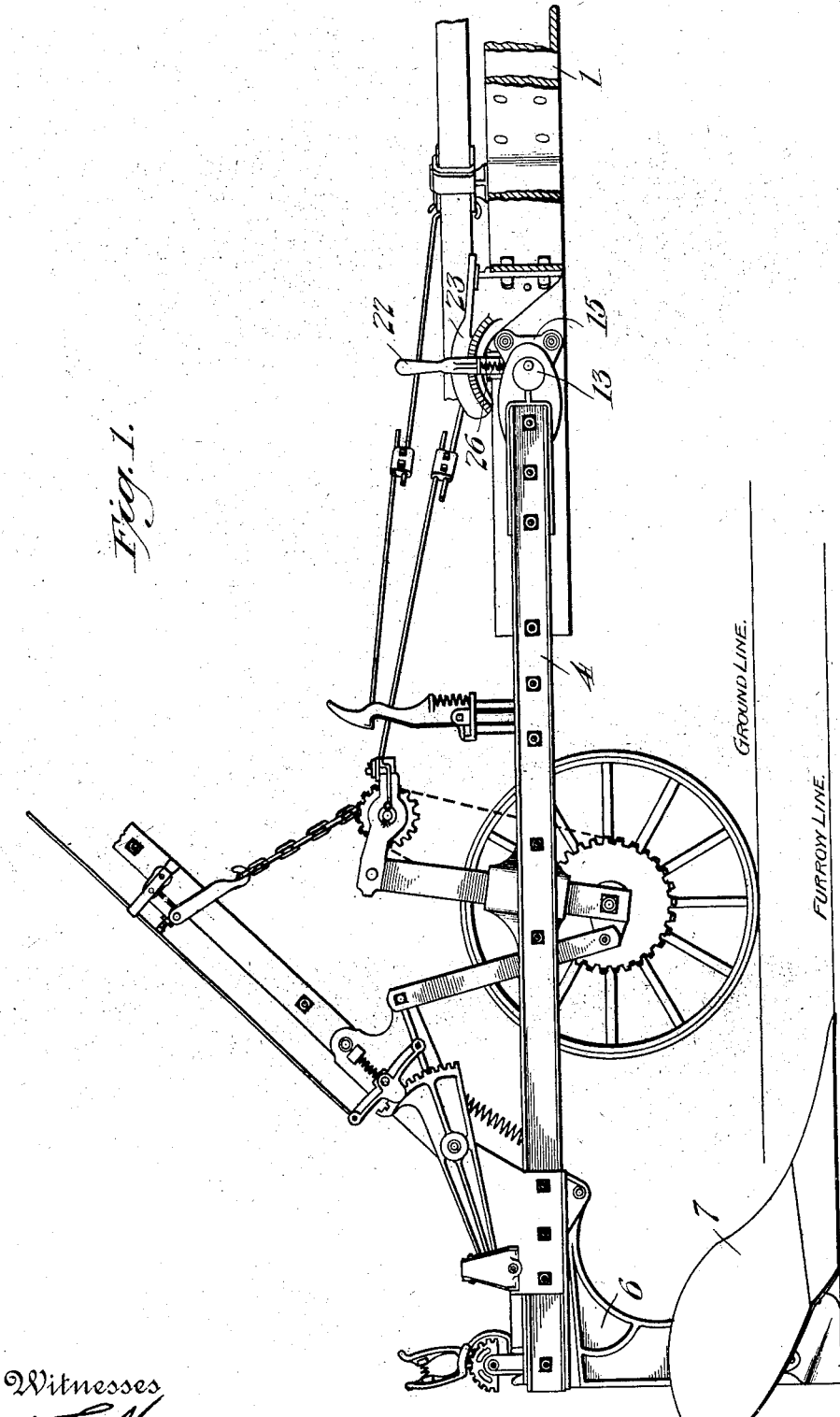

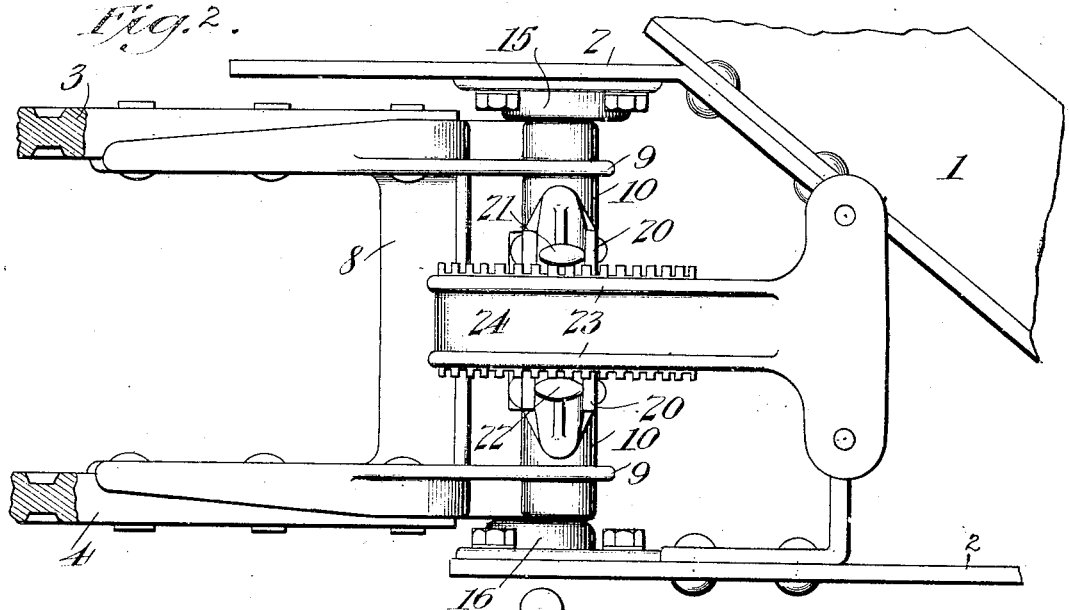
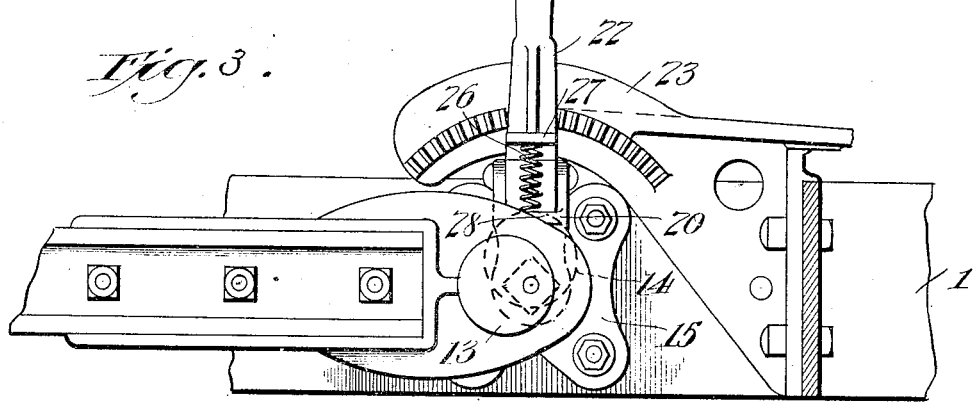
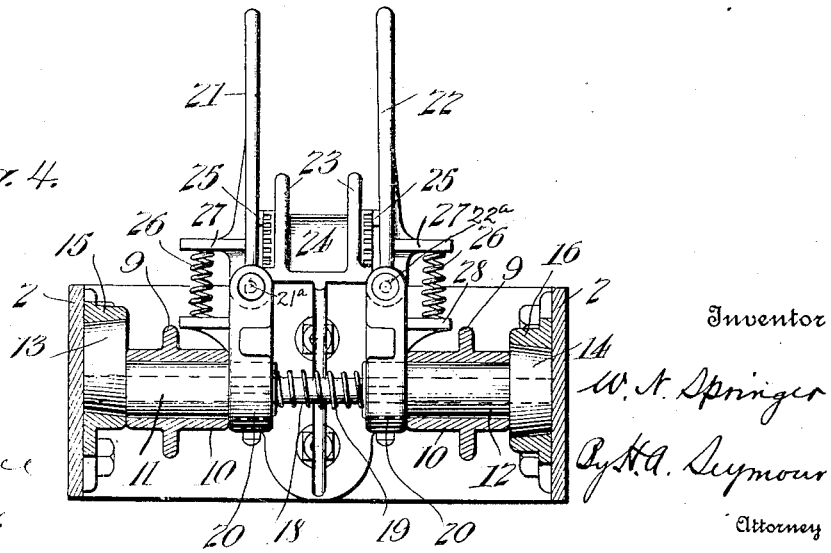

WILLIAM N. SPRINGER, OF SOUTH BEND, INDIANA, ASSIGNOR TO OLIVER CHILLED PLOW WORKS, OF SOUTH BEND, INDIANA.

GANG-PLOW.

1,101,349.   Specification of Letters Patent.   Patented June 23, 1914.

Application filed September 17, 1913. Serial No. 790,342.

*To all whom it may concern:*

Be it known that I, WILLIAM N. SPRINGER, of South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

This invention relates to improvements in gang plows, and more particularly to means for adjusting the same,—the object of my present invention being to provide simple and efficient means for adjusting the plows to properly space them from each other, and for adjusting the beams to level the soil-engaging members or "plow bottoms."

With this and other objects in view, the invention consists in certain novel features of construction and combinations of parts as hereinafter set forth and pointed out in the claims.

In the accompanying drawings, Figure 1 is a view in side elevation illustrating an embodiment of my invention, and Figs. 2, 3, and 4 are detail views.

1 represents the rear diagonal beam of the truck frame of an engine gang plow structure and to this beam brackets 2 are secured, the number of such brackets corresponding to the number of plow units to be employed. In the drawing, a single plow unit is shown, but it will be understood that a plurality of such units will be comprised in the plow structure. All of said plow units and the adjusting means therefor, are the same in construction, and hence a detail description of one will suffice for all. Each plow unit comprises two beam members 3—4 spaced apart and at their rear ends these members receive between them the upper portion of a plow standard 6, said standard being secured at its lower end to the soil-engaging member 7. The forward ends of the beam members 3—4 are connected by a bracket 8, and the latter is provided with forwardly projecting arms 9 having bosses 10. Sleeves 11—12 are mounted in the bosses 10 and are provided at their outer ends with eccentrics 13 and 14 respectively (each preferably having a slight taper), which enter eccentric boxes 15—16 secured to the side members of the bracket 2. Normally, the eccentrics 13—14 are disposed approximately at right angles to each other,—viz., approximately 90° apart and the eccentric boxes 15—16 are so positioned as to receive the eccentrics thus disposed. A rod 18 passes through the two sleeves 11, 12 and is mounted at its ends in the eccentrics 13, 14. This rod serves to support a spring 19 which bears at its ends against the inner ends of the sleeves and insures close fit of the eccentrics in their boxes, but permits said eccentrics to yield sufficiently to enable the shifting adjustments of the beam members as hereinafter described. The inner end portions of the sleeves 11—12 are made angular exteriorly as shown at 20ª and to these angular portions of the sleeves, arms 20 having bifurcated upper ends, are secured. Levers 21—22 are pivotally connected at 21ª, 22ª with the bifurcated upper ends of the arms 20 and between said levers, segments 23 are located,—said segments being formed at respective sides of a bracket 24 secured to the truck-frame bracket 2. The levers 21—22 are provided with detents 25 to engage the segments and are normally pressed into such engagement by means of springs 26, which bear at their respective ends against lugs 27 on the levers and lugs 28 on the arms 20.

With the construction and arrangement of parts as above described, the sleeves 11—12 and their connection with the bracket 2 on the truck frame, constitute pivotal supports for the forward end of the plow beam, and on which said beam may swing vertically during the normal operation of the plow. By moving the lever 21 in one direction or the other, the eccentric 13 with which this lever is connected will be turned in the eccentric box 15, and one side of the bracket 8 with which the beam members are connected will be moved forwardly or backwardly, and thus cause the plow beam, standard and soil-engaging member to be moved laterally for the purpose of properly spacing the plow unit from its neighbors. When the lever 22 is moved, the eccentric 14 will be turned in the eccentric box 16 and one side of the bracket 8 will be raised or lowered and one beam member will be raised or lowered relatively to the other, thus effecting an adjustment of the plow unit to properly level the soil engaging member.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a truck frame, a truck frame bracket, and a plow, of boxes on the truck frame bracket, eccentrics carried by the plow and mounted in said boxes, and manually operable means connected with each of said eccentrics for operating the same to adjust the plow.

2. The combination with a truck frame and a plow, of boxes disposed opposite to each other and carried by the truck frame, eccentrics carried by the plow and mounted to turn in said boxes and manually operable means for operating said eccentrics.

3. The combination with a frame and a plow, of two boxes carried by the frame, eccentrics carried by the plow and mounted in said boxes, said eccentrics being normally disposed at approximately right angles to each other, and operating means connected with each eccentric.

4. In a gang plow, the combination with a truck frame, truck frame brackets and plow units, of boxes secured to each truck frame bracket, eccentrics carried by each plow unit and mounted in said boxes and means for operating said eccentrics to adjust the plow unit.

5. In a gang plow, the combination with a truck frame, a truck frame bracket, and a plow unit, of cam boxes secured to the truck frame bracket, eccentrics carried by the plow and mounted in said boxes, a segment connected with the truck frame bracket, and a lever secured to each eccentric and provided with means to engage said segment.

6. In a gang plow, the combination with a truck frame and a plow, of two eccentric structures connecting the plow with the truck frame and constituting pivotal connections for said plow, and means for independently operating said eccentric structures to effect lateral and leveling adjustments of the plow.

7. In a gang plow, the combination with a truck frame, a bracket secured thereto, and a plow, of a bracket secured to the plow, eccentric connections between respective sides of said bracket and respective members of the adjacent truck frame bracket, means for operating one of said eccentrics to effect lateral adjustment of the plow, and means for operating the other eccentric to effect leveling adjustment of the plow.

8. In a gang plow, the combination with a truck frame, a bracket secured thereto and a plow, of a bracket secured to the plow, sleeves mounted in said last-mentioned bracket, eccentrics carried by said sleeves, one of said eccentrics normally disposed at an angle with respect to the other, boxes secured to opposite members of the adjacent truck bracket and receiving said eccentrics, and levers connected with said eccentrics for turning the same to effect lateral and leveling adjustments of the plow unit.

9. In a gang plow, the combination with a truck frame, a truck frame bracket and a plow, of a bracket secured to the plow, sleeves mounted in said last mentioned bracket, eccentrics carried by said sleeves and disposed at an angle to each other, boxes secured to opposite members of the adjacent truck frame bracket and receiving said eccentrics, pivoted spring-pressed levers connected with said sleeves, segments disposed between said levers and secured to the truck frame bracket, and detents on said levers to engage the segments.

In testimony whereof, I have signed this specification in the presence of two subscribing witnesses.

WILLIAM N. SPRINGER.

Witnesses:
 EDWIN NICAR,
 KATE E. BUCKLEY.